Figure 1:
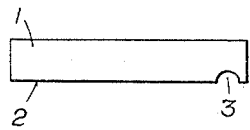

FIG.22                    FIG.23

FIG.24                    FIG.25

United States Patent Office 3,381,972
Patented May 7, 1968

3,381,972
SKI PROVIDED WITH TRACKING MEANS
Earl Andrew Miller, Orem, Utah 84057
Filed Feb. 9, 1965, Ser. No. 431,379
8 Claims. (Cl. 280—11.13)

A major problem which may arise during skiing resides in an excessive lateral slippage of the skis. When a slope is steep and icy, the tracking properties of the known skis are not sufficient. These skis have as tracking means at least one guiding groove extending in the longitudinal direction of the ski at the center of the tread and in many cases have also metal edges. On steep, icy slopes, skis provided with such tracking means slip laterally down the line of fall after each turn. Metal skis are also subject to fluttering and vibration during swing turns at high speed on steep, icy slopes. These disadvantages render skiing more difficult so that any suggestion serving to prevent a loss of the tracking properties, particularly of the edges, and to facilitate swing turns, will constitute a substantial improvement.

The invention relates to a ski which is provided with tracking means consisting preferably of metal edges, particularly of steel and/or at least one guiding groove extending in the longitudinal direction of the ski. In such a ski, the above-mentioned disadvantages are avoided according to the invention in that at least one guiding groove disposed near the edge of the tread and/or at least one guiding part protruding from the tread or a guiding groove having a triangular cross-section is provided and extends at least along a part of the length of the ski.

In practice it is desirable if the guiding groove disposed near the edge of the tread is adjacent to the inner edge of the ski. This means that in a pair of skis the guiding grooves are disposed on the right-hand side of the tread of the left-hand ski and on the left-hand side of the tread of the right-hand ski and extend at least throughout a major part of the length of the ski. In another desirable design, a protruding guiding part is provided approximately at the center of the tread. A further improvement in the tracking properties can be obtained if any guiding part protruding from the tread has at least along a part of its length recesses and projections which succeed preferably periodically in the longitudinal direction of the guiding part.

In another preferred embodiment of the invention, the guiding part is formed by a rotatably mounted body, which is substantially circular in cross-section and partly protrudes from the tread of the ski. The body which forms the guiding part has desirably an extension, which protrudes into the interior of the ski and is supported by coil springs. Besides, that portion of the body which protrudes from the tread of the ski may have at least one extension or projection.

To improve the flexibility of the skis and the velocity which can be obtained, the guiding parts provided on the tread are preferably divided into separate sections by a thin cutting device after they have been affixed. An additional improvement of the tracking properties can be achieved if each guiding part or each metal edge provided with the guiding grooves or the like is secured to the ski with a strip of rubber or insulating material interposed along at least a part of the length of such guiding part or metal edge.

According to another feature of the invention, the two skis of a pair are different, the curvature of the ski from the base of tip of the ski to the rear end of the ski being greater along the inner edge than along the outer edge of the ski. This design affords the advantage that turns are much facilitated because the inner edge of the ski, particularly of the lower ski, effects in most cases the entire turn and the turn begins as soon as the ski is outwardly deflected under the weight of the skier at this edge.

Further features of the invention will be explained hereinafter with reference to embodiments shown by way of example in the drawing, in which FIGS. 1 to 6 are rear views showing skis which are provided with guiding grooves. FIGS. 7 to 16 are also rear views showing skis provided with guiding parts protruding from the tread. FIGS. 17 to 21 are side elevations showing skis having guiding parts as shown in FIGS. 7 to 16. FIGS. 22 and 23 are transverse sectional views showing skis having rotatably mounted guiding parts. FIG. 24 shows a special design of a ski. FIG. 25 is a sectional view taken on line A—B of FIG. 24.

Figure 2:
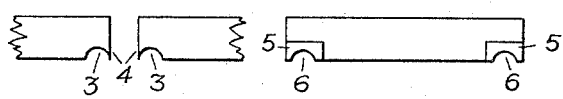

FIG. 1 is a rear view showing a ski 1, which has a longitudinal guiding groove 3 near the edge of the tread 2. As is shown in FIG. 2 illustrating a pair of skis, this guiding groove is suitably disposed adjacent to the inner edge 4 of each ski because the inner edges are more highly loaded in most cases.

Figure 3:
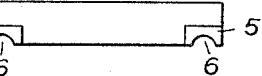
Figure 4:
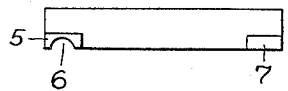

A ski 1 having steel edges 5 may be provided with guiding grooves 6 in each steel edge (FIG. 3). Alternatively, only the inner steel edge 5 may be provided with a guiding groove 6 and the outer steel edge 7 may be flat, as usual. This is shown in FIG. 4 in a rear view of a right-hand ski.

Figure 5:
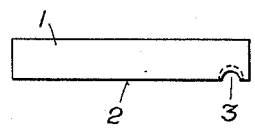

FIG. 5 indicates that the cross-section of the guiding groove 3 is not constant throughout the length of the ski. Practical tests have shown that the guiding groove 3 should preferably be deeper in the central portion of the ski 1, particularly below the ski binding, than adjacent to the forward and rear ends.

Figure 6:
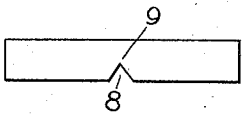

FIG. 6 shows a guiding groove 8 according to the invention. This groove extends outwardly from an apex point or vertex 9 to have a triangular cross-section.

The guiding grooves according to the invention shown in FIGS. 1 to 6 extend at least along a major part of the length of the ski. The outside surface of the guiding groove and/or the surface between the guiding groove and the edge of the ski is preferably serrated at least along a part of the length of the ski. On icy courses, this ensures a better grip of the ski edges and improved tracking.

FIGS. 7 to 16 show skis 1 having guiding parts which protrude from the tread 2 and extend at least along a major part of the length of the ski. These guiding parts have much better tracking properties than the known guiding grooves extending along the center line of the skis because when the edges are set into the snow, particularly when skiing transversely on an iced slope, these grooves cannot contact the snow surface and thus do not contribute to the tracking properties of the ski under such conditions.

Figure 7:
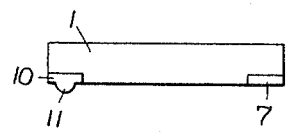
Figure 8:
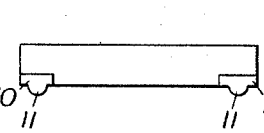

FIG. 7 shows a ski 1, which has an inner steel edge 10 provided with a guiding part 11 which protrudes from the tread whereas the outer steel edge 7 is flat in known manner. As is shown in FIG. 8, each of the steel edges 10 may be provided with a guiding part 11, which may have, e.g., a semicircular cross-section.

Figure 9:
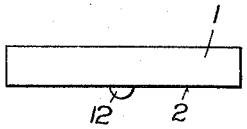
Figure 10:
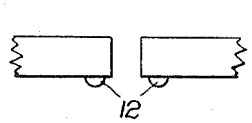

FIG. 9 shows a ski 1 having a guiding part 12, which is disposed approximately at the center of the tread 2 and has a semicircular cross-section. The effect of such guiding parts 12 may be increased if they are disposed adjacent to the inner edges of the skis. This is illustrated in FIG. 10 showing a pair of skis.

Figure 11:
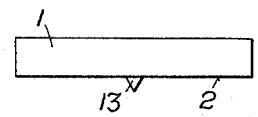

Excellent tracking properties are particularly afforded by the guiding part 13 which is shown in FIG. 11. This guiding part is triangular in cross-section and its depending vertex is highly effective, particularly on strongly iced courses.

Figure 12:
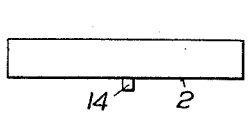
Figure 13:
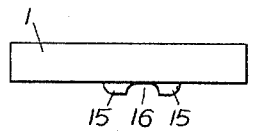

FIG. 12 shows a left-hand ski 1, which is provided on its tread 2 with a guiding part 14, which is generally rectangular in cross-section. This guiding part is preferably arranged on edge and has a rounded lower edge. FIG. 13 shows a left-hand ski 1 having a guiding part 15, which is rectangular in cross-section and has rounded lower edges. This guiding part 15 lies flat against the underside of the ski and has at its center a preferably semicircular recess 16.

Figure 14:
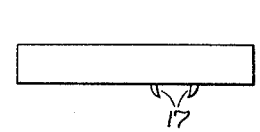
Figure 15:
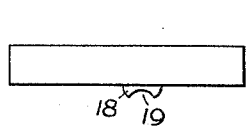

FIG. 14 is a rear view showing a left-hand ski. Two guiding parts 17 protrude from the tread 2 of said ski and in cross-section have the shape of the ends of a half-moon. The guiding parts 17 are mutually symmetrically disposed, preferably between the center line and the inner edge of the ski. FIG. 15 is also a rear view and shows a left-hand ski 1 having a guiding part 18, which is approximately semicircular in cross-section and has at its lower edge a recess, which extends preferably along an arc of a circle. Thus recess 19 may be shaped, accordingly, by hollow grinding.

Figure 16:
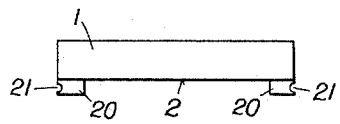

In the embodiment shown in FIG. 16, two guiding parts 20 protruding from the tread 2 are provided along opposite edges of said tread. These guiding parts have an approximately rectangular cross-section and are formed on their outwardly facing side faces with a groove 21, which extends preferably in the longitudinal direction of the ski.

Figure 17:
Figure 18:
Figure 19:
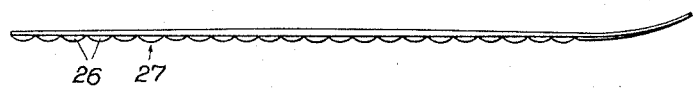
Figure 20:
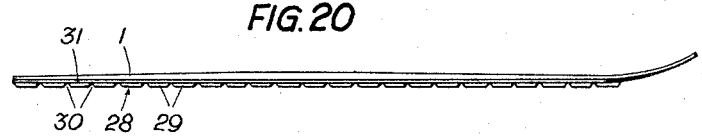
Figure 21:
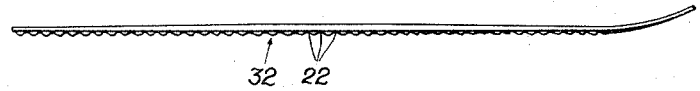
Figure 21:
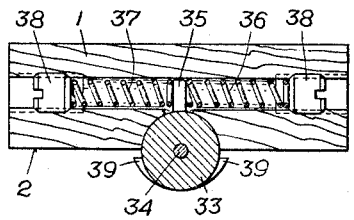
Figure 21:
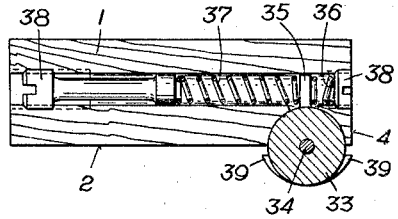
Figure 21:
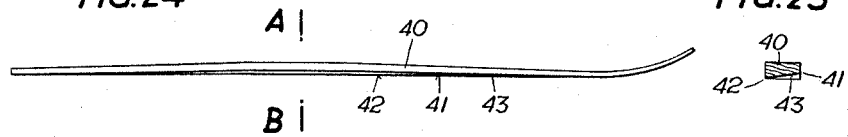
Figure 21:
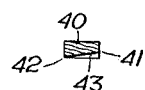

An improved effect of the guiding parts on highly iced courses can be achieved when the guiding parts have recesses and/or projections which succeed in the longitudinal direction. FIG. 17 shows, e.g., a guiding part 22 having arcuate recesses 23 and pointed projections 24. FIG. 18 shows a guiding part 25 having spaced apart, arcuate projections 26. FIG. 19 shows a guiding part 27 having successive arcuate projections 26. FIG. 20 shows a guiding part 28 having trapezoidal projections 29 and triangular recesses 30. The guiding part is secured to the ski 1 preferably with an interposed strip 31 of rubber or the like. FIG. 21 shows a guiding part 32 having arcuate recesses 22 and also arcuate projections.

The guide parts shown in FIGS. 17 to 21 may be used with any of the cross-sections and arrangements shown in FIGS. 7 to 16. It is particularly desirable, however, to provide the guiding part 31 of FIG. 20 in the cross-sectional shape of the guiding part 14 of FIG. 12.

In a modification of the illustrative embodiments shown in FIGS. 17 to 21, the serrated guiding parts may extend only along a part of the length of the ski, particularly in the region below the binding. Such designs distinguish by good tracking and turning properties.

In skis provided with any of the steel edges and/or guiding parts shown in FIGS. 3, 4 and 7 to 21, strips of rubber or other insulating material may be provided between these edges and guiding parts and the ski. The strips may be thicker adjacent to the foot plate of the ski than adjacent to the ends of the ski and/or the strips on the inner edge of the ski may be thicker than those on its outer edge. Strips of different materials may be interposed with advantage in different length sections. Instead of rubber, cork, foamed rubber or plastics may be used to special advantage as a material for the strips.

FIG. 22 shows a ski 1 having a guiding body 33, which is partly sunk into the tread 2 and rotatable about an axis 34. This guiding body 33 has preferably an extension 35, which protrudes into the interior of the ski. Coil springs 36 and 37 bear on opposite sides of this extension 35. The other ends of the coil springs are preferably adjustably supported, for instance, by a bolt 38 for each spring. Thus, the initial stress of the springs may be adjusted, e.g., in accordance with the weight of the skier or in dependence of the use of the ski as an upper or lower ski.

The guiding body 33, which extends at least along a part of the length of the ski, particularly along the portion below the ski binding, is provided with wings, projections or extensions 39. The preferred extensions 39 shown in FIG. 22 merge at their lower edge approximately tangentially into the body 33 and form a step at their top edge. This design has the advantage that under a lateral pressure on the body 33, e.g., during a lateral slip, the body 33 is rotated and the resistance opposing such slip is immediately increased by the wings, extensions 39 or the like.

FIG. 23 shows a similar design, in which the guiding body 33 is slightly spaced from the inner edge 4 of the ski 1 and the spring 37 opposing a pressure from the outside on the body 33 is much stronger than the other spring 36 so that, e.g., the lower ski has a stronger guiding power than the upper ski.

FIG. 24 shows a left-hand ski 40 as viewed from the inside. The inner edge 41 of this ski has a greater curvature than the outer edge 42 so that the tread 43 is twisted, as is also shown in FIG. 25. The steel edges may conform to the ski. Alternatively, the two steel edges may have different curvatures and may be secured to the ski with different interlayers of rubber or the like so that the ski may have other curvatures than the steel edges.

In a practical embodiment, the inner edge of the ski may form an arc having a larger center angle than that of the outer edge, beginning at the base of the tip of the ski and extending at least along a part of the side of the ski. Ski edges having different curvatures may be used in any of the embodiments shown in FIGS. 1 to 23. Owing to the different design of the skis of a pair, a ski having a greater curvature on its right-hand side is preferably marked as a "left-hand" ski and a ski having a greater curvature on the left side is marked as a "right-hand" ski.

What I claim is:

1. The combination with a ski having a tread surface, an upper surface, and inner and outer edge surfaces substantially perpendicular to the tread and upper surfaces of means operably related to the tread surface for guiding the ski, said guiding means including a metal strip positioned in a recess provided in the tread surface having a width terminating short of the longitudinal center line of the ski and inner edge surface and extending longitudinally of the tread surface and inner edge surface for a substantial portion of the length of the ski, said metal strip having a lower face flush with the tread surface and a side face flush with the inner edge surface, and a guiding part which is semicircular in cross-section protruding downwardly from the lower face of the metal strip inwardly of said side face.

2. The combination as claimed in claim 1 further including a similar guiding means positioned in a second recess provided in the tread surface and outer edge surface in which the guiding part of the similar guiding means is semicircular in cross-section.

3. The combination with a ski having a tread surface, an upper surface, and inner and outer edge surfaces substantially perpendicular to the tread and the upper surfaces of means operably related to the tread surface for guiding the ski, said guiding means including a metal strip positioned in a recess provided in the tread surface having a width terminating short of the longitudinal center line of the ski and inner edge surface and extending longitudinally of the tread surface and inner edge surface for a substantial portion of the length of the ski, said metal strip having a lower face flush with the tread surface and a side face flush with the inner edge surface, and a guiding part protruding downwardly from the lower face of the metal strip inwardly of said side face and said guiding part including alternating spaced apart projections and recesses extending longitudinally of the lower face of the metal strip.

4. The combination as claimed in claim 3 in which said projections are pointed and said recesses are arcuate.

5. The combination as claimed in claim 3 in which said projections are arcuate and said recesses are planar.

6. The combination as claimed in claim 3 in which said projections and recesses are defined by successive arcuate projections.

7. The combination as claimed in claim 3 in which said projections are defined by trapezoidal elements and said recesses are triangular.

8. The combination as claimed in claim 3 in which said projections and recesses are arcuate.

References Cited

UNITED STATES PATENTS 3,063,728   11/1962   Patterson _____ 280—11.13

FOREIGN PATENTS

| 192,309 | 10/1957 | Austria. |
| 771,622 | 7/1934 | France. |
| 1,274,895 | 9/1961 | France. |
| 1,368,152 | 6/1964 | France. |
| 64,548 | 3/1942 | Norway. |
| 95,544 | 8/1959 | Norway. |
| 180,437 | 1/1936 | Switzerland. |
| 200,702 | 1/1939 | Switzerland. |
| 211,320 | 12/1940 | Switzerland. |
| 232,150 | 8/1944 | Switzerland. |
| 250,679 | 6/1948 | Switzerland. |
| 265,869 | 3/1950 | Switzerland. |
| 296,027 | 4/1954 | Switzerland. |

BENJAMIN HERSH, *Primary Examiner.*

MILTON L. SMITH, *Examiner.*